United States Patent

Gulisano et al.

[11] Patent Number: 6,119,406
[45] Date of Patent: Sep. 19, 2000

[54] DOOR TRIM PANEL ASSEMBLY AND PLASTIC INNER PANEL FOR USE THEREIN

[75] Inventors: Salvatore J. Gulisano, Fraser; Michael Mazzola, Columbus Township; Stephen C. Ivy, Ypsilanti, all of Mich.; Rhys Johnson, Melbourne, Australia

[73] Assignee: Patent Holding Company, Fraser, Mich.

[21] Appl. No.: 09/213,072

[22] Filed: Dec. 16, 1998

[51] Int. Cl.<sup>7</sup> ............................................... B60J 5/04
[52] U.S. Cl. ........................................ 49/502; 296/146.5
[58] Field of Search .................. 49/502, 377; 296/146.5; 428/120

[56] References Cited

U.S. PATENT DOCUMENTS

| | | |
|---|---|---|
| 4,089,134 | 5/1978 | Koike . |
| 4,696,128 | 9/1987 | Fukuhara . |
| 4,945,682 | 8/1990 | Altman et al. ............................ 49/502 |
| 5,005,317 | 4/1991 | Augustin et al. . |
| 5,040,335 | 8/1991 | Grimes ...................................... 49/502 |
| 5,069,858 | 12/1991 | Hendry . |
| 5,085,005 | 2/1992 | Yasukawa et al. . |
| 5,111,619 | 5/1992 | Billin et al. . |
| 5,170,586 | 12/1992 | Ose et al. ................................. 49/377 |
| 5,207,027 | 5/1993 | Larsen . |
| 5,224,299 | 7/1993 | Abe ........................................... 49/502 |
| 5,225,141 | 7/1993 | Hendry . |
| 5,345,721 | 9/1994 | Stein et al. ............................... 49/502 |
| 5,433,038 | 7/1995 | Dupuy . |
| 5,447,762 | 9/1995 | Loren . |
| 5,493,815 | 2/1996 | Belser et al. . |
| 5,519,968 | 5/1996 | Dupuy . |
| 5,544,448 | 8/1996 | Mass . |
| 5,603,548 | 2/1997 | Gandhi et al. ........................ 296/146.7 |
| 5,667,868 | 9/1997 | Freeman .................................. 428/120 |

FOREIGN PATENT DOCUMENTS 0 472 788 B1  2/1995  European Pat. Off. .

*Primary Examiner*—Daniel P. Stodola
*Assistant Examiner*—Curtis A. Cohen
*Attorney, Agent, or Firm*—Brooks & Kushman P.C.

[57] ABSTRACT

An automotive door trim panel assembly including a plastic inner panel having a relatively thick, rigid, hollow retaining section which is designed for snap-fit installation of the assembly with a weather seal having a snap-on groove defined therein to thereby eliminate the need for additional fastening hardware while at the same time to provide increased rigidity and ease of tooling. The assembly also includes a contour door trim member for the inner panel.

14 Claims, 2 Drawing Sheets

DOOR TRIM PANEL ASSEMBLY AND PLASTIC INNER PANEL FOR USE THEREIN

CROSS-REFERENCE TO RELATED APPLICATION

This application is related to U.S. patent application Ser. No. 09/114,393, filed Jul. 13, 1998, entitled "Hollow Plastic Article Formed By A Gas-Assisted Injection Molding System".

TECHNICAL FIELD

This invention relates to automotive assemblies and plastic articles for use therein and, in particular, to automotive door trim panel assemblies and plastic inner panels for snap-fit installation of the article and, consequently, the assembly with a weather seal of an automotive vehicle.

BACKGROUND ART

A door panel assembly of an automotive vehicle is typically secured to a door belt seal by clips. For example, the U.S. Pat. No. to Billin et al. 5,111,619 discloses an assembly for mounting a door trim panel having a mounting surface to a vehicle body door. The door trim panel has a plurality of appendages which project downward from the door trim panel and a plurality of fingers depending downward in proximity to an upper edge of the door trim panel. The door has a plurality of openings for receiving the appendages of the door trim panel adapted for securing the door trim panel to the door. The clips secured to the vehicle body door have a ramp surface for engagement by the finger of the door trim panel and adapt to slide the trim panel vertically relative to the door trim panel as the door trim panel is moved towards the body door. An engagement surface of the clip depends downward from an upper edge of the ramp surface for engaging the finger securing the trim panel to the body door.

It is desirable to incorporate stiffening members within an automotive door. For example, the U.S. Pat. No. to Mass 5,544,448 discloses a structural door belt seal for an automotive vehicle which includes an elastomeric seal member mounted on a belt edge portion of the door and a stiffening member carried within the elastomeric seal member, and further including a reinforcing member extending outwardly from the elastomeric seal member with the stiffening member.

Other U.S. patents disclose the use of clips to secure a molding of an automobile door to the lower edge of an outer panel window as shown in the U.S. Pat. No. to Fukuhara 4,696,128; the U.S. Pat. No. to Koike 4,089,134; and the U.S. Pat. No. to Yasukawa 5,085,005.

Some of the sealing strips have integrally formed fastening mechanisms to simplify fabrication and assembly steps. Examples are disclosed in the U.S. Pat. Nos. to Dupuy 5,433,038 and 5,519,968.

Some sealing strips include metallic layers such as disclosed in the U.S. Pat. Nos. to Saint-Louis Augustin et al. 5,005,317; Larsen 5,207,027 and Belser et al. 5,493,815.

As described in U.S. Pat. Nos. 5,225,141, 5,069,858, and 5,447,762, it is known in the plastic molding art to use pressurized fluid in conjunction with the plastic molding of articles. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

Gas-assisted injection molding has been used to produce a wide variety of automotive parts as shown in European Patent Specification 472,788 and as shown in the above-noted application entitled "Hollow Plastic Article Formed By A Gas-Assisted Injection Molding System."

DISCLOSURE OF INVENTION

An object of the present invention is to provide an automotive assembly such as a door trim panel assembly and a plastic article such as an inner panel for use therein for snap-fit installation with an automotive part such as a weather seal to eliminate the need for additional fastening hardware.

Another object of the present invention is to provide an automotive door trim panel assembly and a plastic inner panel for use therein wherein an upper belt line of an automotive door has increased structural properties.

Yet another object of the present invention is to provide an automotive door trim panel assembly and a plastic inner panel for use therein which has a relatively thick, rigid plastic retaining section for increased rigidity for snap-fit attachment with another automotive part and for ease of tooling.

In carrying out the above objects and other objects of the present invention, an automotive door trim panel assembly for snap-fit installation to a weather seal having a snap-on groove defined therein by movable walls is provided. The assembly includes a synthetic resin inner panel and a contour door trim member for the inner panel. The panel includes a relatively thin body section and a relatively thick rigid retaining section connected thereto. The retaining section is adapted to cooperate with the snap-on groove for affixing the weather seal to the assembly. The walls move in opposite directions as the retaining section enters and abuttingly engages the snap-on groove thereby retaining the weather strip on the assembly.

Further in carrying out the above objects and other objects of the present invention, a hollow plastic article of a one-piece construction is provided. The article is formed from a molten plastic resin by a gas-assisted injection molding system including a mold having an article-defining cavity and an injection aperture wherein molten plastic resin is injected through the injection aperture and wherein pressurized fluid is communicated to the molten plastic resin in the article-defining cavity to at least partially distribute the molten plastic resin. The article includes a hollow retaining section including walls formed by the pressurized fluid to define a gas channel which extends at least partially through the hollow retaining section. The article also includes a solid body section connected to the retaining section. The retaining section is adapted to cooperate with a snap-on groove of a part for affixing the part to the article. The retaining section causes at least one movable wall of the part to move as the retaining section enters and abuttingly engages the snap-on groove.

Still further in carrying out the above objects and other objects of the present invention, a synthetic resin inner panel for automotive vehicles and the like is provided for snap- fit fastening to a weather seal having a snap-on groove defined therein by movable walls. The panel includes a relatively thin body section and a relatively thick rigid retaining section connected thereto. The retaining section is adapted to cooperate with the snap-on groove for affixing the weather seal to the panel. At least one of the walls move as the retaining section enters and abuttingly engages the snap-on groove thereby retaining the weather strip on the panel.

Preferably, the retaining section is characterized in cross section as having at least one engagement portion extending outwardly from an outer edge of the snap-fit section for contacting the at least one movable wall of the weather seal during snap-fit installation of the panel with the weather seal.

Also, preferably, the at least one engagement portion includes an inclined outer surface for cooperating with the at least one movable wall for sliding the weather strip onto the retaining section.

Still, preferably, the at least one engagement portion also includes a side surface adjacent its respective inclined outer surface for cooperating with the at least one movable wall for retaining the weather strip on the retaining section.

The inner panel preferably includes a tapered neck section for connecting the retaining section to the body section.

Also, preferably a hollow inner channel defined by a surrounding resin wall is provided in the retaining section for strengthening the retaining section. In cross section, the hollow inner channel is at least partially surrounded by a portion of the resin wall of substantially the same thickness as the thickness of the body section.

The weather seal may be an inner-belt weather seal.

The hollow inner channel is preferably a gas channel.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
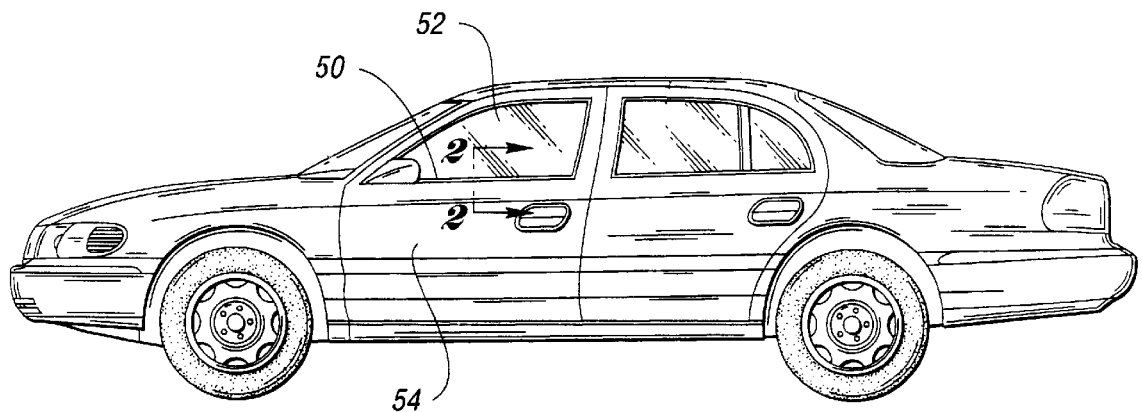
FIG. 1 is a side view of an automotive vehicle in which an automotive door trim panel assembly and inner panel of the present invention can be incorporated.
Figure 3:
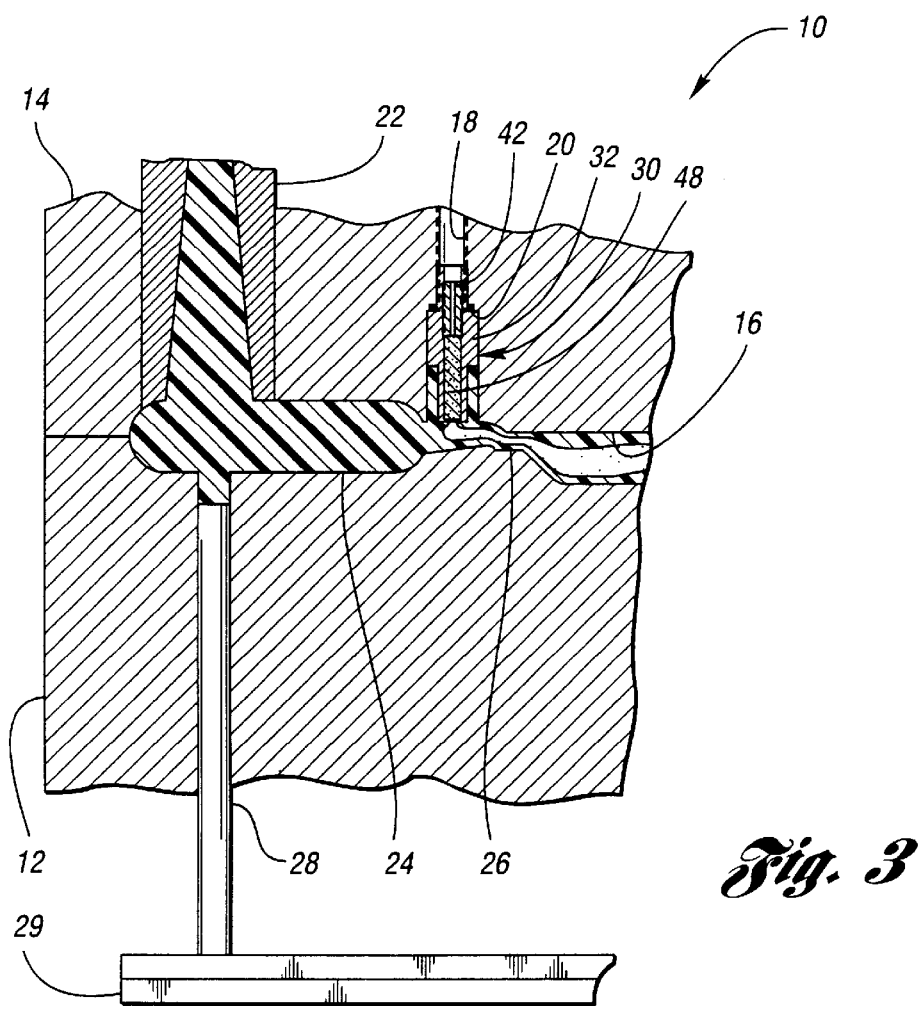
FIG. 3 is a view, partially broken away and in cross-section, of a mold for making a synthetic resin inner panel with a gas channel formed in a retaining section of the panel.

Referring now to the drawing Figures, there is illustrated in FIG. 3 a mold, generally indicated at 10, for use in a gas-assisted injection molding system for making an inner panel of the present invention. The mold 10 includes a first mold half 12 and a second mold half 14. The first and second mold halves 12 and 14, respectively, are movable relative to each other between an open position and a closed position as shown in FIG. 1, wherein the first and second mold halves 12 and 14 respectively define an article-defining cavity 16 for the inner panel.

The second mold half 14 includes a gas passageway 18 which extends from an exterior surface (not shown) of the second mold half 14 to an inner interior surface 20 of the second mold half 14 in fluid communication with the article-defining cavity 16.

The second or stationary mold half 14 includes a sprue 22 for communicating thermoplastic material to a runner 24 which, in turn, communicates with the article-defining cavity 16 via a gate 26. A thermoplastic flow path is defined by the sprue 22, the runner 24 and the gate 26. Ejector pins such as an ejector pin 28 extend through the first or movable mold half 12 and are connected to an ejector plate 29. The ejector plate 29 is supported to move relative to the first mold half 12 from a retracted position to an extended position to eject a completed part from the article-defining cavity 16 as well as the plastic in the runner 24 and the sprue 22.

The mold 10 also includes a gas pin assembly, generally indicated at 30. The gas pin assembly 30 includes a one-piece housing 32. A base portion of the housing 32 is threadedly secured to the second mold half 14 at the interior surface 20 of the second mold half 14 so that the gas pin assembly 30 can be readily removed from the second mold half 14 in the open position of the mold 10. A rubber O-ring is typically provided about the base portion of the housing 32 to seal the housing 32 within the second mold half 14.

Preferably, the housing 32 also includes a hexagonal head portion so that the assembly 30 can be readily removed from the second mold half 14 in the open position of the mold 10 by a conventional tool (not shown).

The housing 32 includes an elongated aperture formed therein in communication with and aligned with the gas passageway 18 to permit the flow of gas therethrough.

The base portion of the housing 32 is also internally threaded to threadedly secure therein a holding device in the form of a set screw 42 which has a gas hole formed completely therethrough to permit the flow of gas therethrough.

The gas pin assembly 30 also includes a porous insert 48 comprising a sintered material such as aluminum, copper, nickel, steel, bronze, porcelain, and brass which permits the flow of gas therethrough but prevents the passage of molten plastic therethrough. The insert 48 is held in position within the aperture by the set screw 42 at one end thereof and by flanges of the head portion at the opposite end thereof.

The sintered material is preferably a bronze sintered material and can filter out foreign particles down to 20 microns. However, the micron size can be varied depending on the type of plastic utilized in the molding process.

While the gas pin assembly 30 is illustrated as the particular mechanism for injecting pressurized gas into the article-defining cavity 16, other mechanism can be utilized to inject pressurized gas into the article-defining cavity 16 as illustrated and described in some of the prior art documents noted in the "Background Art" portion of this application.

The mold 10 also preferably includes a spill cavity (not shown) and a secondary runner (not shown), for flow coupling the spill cavity to the article-defining cavity 16.

Referring now to FIG. 1, there is illustrated a side view of an automobile showing a location for use in the present invention. The automobile includes an outer belt-line weather strip or seal 50 where a movable side window glass 52 meets a door outer sheet metal panel 54. However, it is to be understood that the invention is broad enough to include other automotive applications or even non-automotive applications wherein it is desired to provide a structurally sound snap-fit to a plastic part or article.

Figure 2:
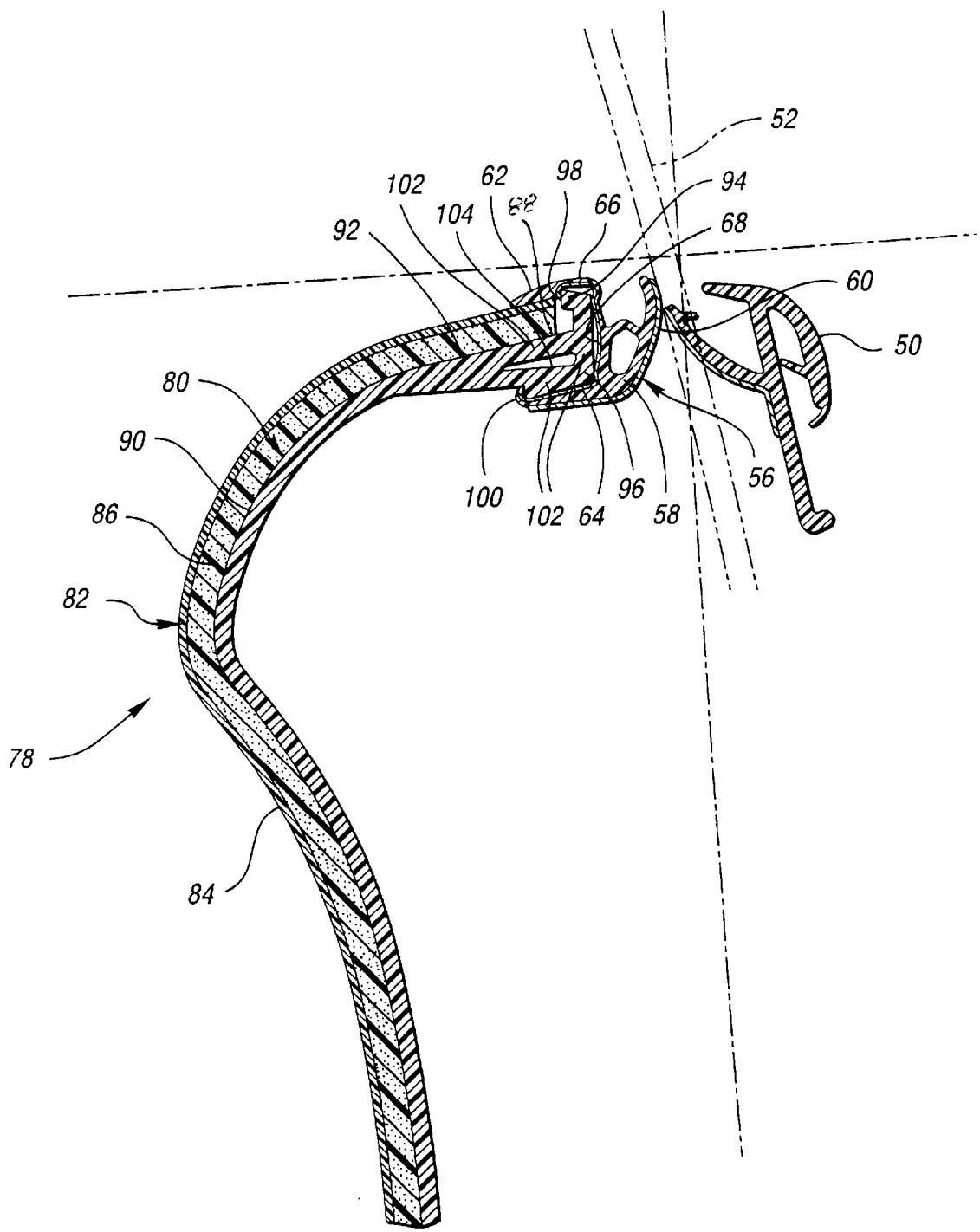
FIG. 2 is a sectional view taken along lines 2—2 of FIG. 1 of the automotive door trim panel assembly of the present invention.

Referring now to FIG. 2, which is a sectional view taken along lines 2—2 of FIG. 1, there is illustrated an inner belt weather seal or a weather strip, generally indicated at 56. The weather strip 56 includes a hollow body section 58 including flocking 60 formed on an outer surface thereof to provide a seal against the window glass 52.

The weather strip 56 also includes resilient top and bottom walls 62 and 64, respectively, which are integrally formed with the hollow body section 58. Inner surfaces of the top and bottom walls 62 and 64 together with an inner surface of the hollow body section 58 are defined by a flexible concave metal layer 66, the upper and lower portions of which move together with the upper and lower walls 62 and 64, respectively.

An automotive door trim panel assembly constructed in accordance with the present invention is generally indicated at 78. The assembly 78 includes a synthetic resin inner panel, generally indicated at 80, and a contour door trim member, generally indicated at 82, for the inner panel 80. The door trim member 82 preferably includes a layer 84 of cloth or vinyl and a layer 86 of open cell or closed cell or non-woven foam backing. The trim member 82 is preformed and semi-rigid and is preferably attached to the inner panel 80 by double-sided tape.

The synthetic resin inner panel 80 includes a relatively thick, rigid, hollow retaining or snap fit section 88 which enters and abuttingly engages the snap-on groove 68 so that the walls 62 and 64 of the hollow body section 58 retain the weather strip 56 on the inner panel as described in greater detail hereinbelow. The wall 62 also seals an upper edge of the door trim member 82.

The retaining section 88 is connected to a relatively thin solid body section 90 by a solid tapered neck section 92. The tapered neck section 92, the body section 90 and the retaining section 88, comprise an integral body formed at the same time by the gas-assisted injection molding process performed and described with reference to the mold 10 of FIG. 1.

Referring still to FIG. 3, the retaining section 88 is characterized in cross-section as having a pair of spaced engagement portions 94 and 96 extending outwardly from an outer edge of the snap-fit section and contacting the movable walls 62 and 64, respectively, of the weather strip 56 thereby allowing snap-fit installation of the assembly 78 with the weather strip 56. In particular, each of the engagement sections 94 and 96 includes an inclined outer surface cooperating with the inner metal layer 66 on the movable walls 62 and 64 for sliding the weather strip 56 onto the retaining section 88.

Each of the engagement portions 94 and 96 also includes a side surface adjacent its respective inclined outer surface which are formed as undercuts 98 and 100, respectively, for cooperating with their corresponding movable walls 62 and 64, respectively, for retaining the weather strip 56 on the retaining section 88.

The retaining section 88 has walls 102 formed by the pressurized fluid, described with reference to FIG. 1, which define a gas channel 104 which extends through the retaining section 88 to strengthen the retaining section 88.

The advantages provided by the assembly 78 including the inner panel 80 with the hollow, plastic retaining section 88 are numerous. For example, because the retaining section 88 is integrally formed with the rest of the inner panel 80 in the gas-assisted injection molding process described with reference to FIG. 1, the retaining section 88 can be made relatively thick yet have a consistent thickness to not only provide structural integrity for use to snap-fit a part thereto, but also to provide a thickness which does not vary greatly outside a tight tolerance. In other words, because of the gas-assisted process, sink marks can be avoided on the relatively thick retaining section 88 so that the retaining section 88 can be utilized as part of a structurally sound snap-fit connection. Also, the inner panel 80 can be made of a relatively light weight, inexpensive plastic resin.

The tapered neck section 92 also provides structural integrity so that the thick retaining section 88 does not easily break away from the body section 90 of the inner panel 80. The neck section 92 is tapered to provide a smooth transition between the relatively thick retaining section 88 and the relatively thin body section 90.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. An automotive door trim panel assembly for snap-fit installation to a weather strip having a snap-on groove defined therein by movable walls, the assembly comprising:
   a synthetic resin inner panel; and
   a contour door trim member for the inner panel, the inner panel including:
      a thin body section; and
      a thick snap-fit section connected to the body section, the snap-fit section being adapted to cooperate with the snap-on groove for affixing the weather strip to the assembly, wherein the snap-fit section is characterized in cross section as having at least one snap-on engagement portion extending outwardly from an outer edge of the snap-fit section for contacting one of the movable walls of the weather strip during snap-fit installation of the assembly to the weather strip, and wherein the at least one snap-on engagement portion also includes a sliding surface to slide the one movable wall onto the snap-fit section for retaining the weather strip on the snap-fit section without additional fastening hardware.

2. The assembly as claimed in claim 1 wherein the at least one engagement portion includes an inclined outer surface adjacent its respective side surface for cooperating with the one movable wall for sliding the weather strip onto the retaining section.

3. The assembly as claimed in claim 1 wherein the inner panel further includes a tapered neck section for connecting the retaining section to the body section.

4. The assembly as claimed in claim 1 wherein a hollow inner channel defined by a surrounding resin wall is provided in the retaining section for strengthening the retaining section.

5. The assembly as claimed in claim 4 wherein, in cross section, the hollow inner channel is at least partially surrounded by a portion of the resin wall of substantially the same thickness as the thickness of the body section.

6. The assembly as claimed in claim 4 wherein the hollow inner channel is a gas channel.

7. A synthetic resin inner panel for automotive vehicles for snap- fit fastening to a weather strip having a snap-on groove defined therein by movable walls, the inner panel comprising:
   a thin body section; and
   a thick, rigid snap-fit section connected to the body section, the snap-fit section being adapted to cooperate with the snap-on groove for affixing the weather strip to the panel, wherein the snap-fit section is characterized in cross section as having at least one snap-on engagement portion extending outwardly from an outer edge of the snap-fit section for contacting the at least one movable wall of the weather strip during snap-fit fastening of the panel to the weather and wherein the at least one snap-on engagement portion also includes a sliding surface to slide the at least one movable wall onto the snap-fit section for retaining the weather strip on the snap-fit section without additional fastening hardware.

8. The inner panel as claimed in claim 7 wherein the at least one engagement portion includes an inclined outer surface adjacent its respective side surface for cooperating with the at least one movable wall for sliding the weather strip onto the retaining section.

9. The inner panel as claimed in claim 7 further comprising a tapered neck section for connecting the retaining section to the body section.

10. The inner panel as claimed in claim 7 wherein a hollow inner channel defined by a surrounding resin wall is provided in the retaining section for strengthening the retaining section.

11. The inner panel as claimed in claim 10 wherein, in cross section, the hollow inner channel is at least partially surrounded by a portion of the resin wall of substantially the same thickness as the thickness of the body section.

12. The inner panel as claimed in claim 10 wherein the hollow inner channel is a gas channel.

13. A hollow plastic article of a one-piece construction, the article comprising:
   a hollow snap-fit section including walls which define a channel which extends at least partially through the hollow snap-fit section; and
   a solid body section connected to the snap-fit section, the snap-fit section being adapted to cooperate with a snap-on groove of a part for affixing the part to the article wherein the snap-fit section is characterized, in cross section, as having at least one snap-on engagement portion extending outwardly from an outer edge of the snap-fit section for contacting the at least one movable wall of the part during snap-fit installation, and wherein the at least one snap-on engagement portion also includes a sliding surface to slide the at least one movable wall onto the snap-fit section for retaining the part on the snap-fit section without additional fastening hardware.

14. The article as claimed in claim 13 wherein the at least one engagement portion includes an inclined outer surface adjacent its respective side surface for cooperating with the at least one movable wall for sliding the part onto the retaining section.

* * * * *